Oct. 3, 1961 P. V. H. WEEMS 3,002,278
METHOD FOR SPACE NAVIGATION
Filed March 6, 1959 3 Sheets-Sheet 1

INVENTOR
P. V. H. WEEMS

BY

ATTORNEY

Oct. 3, 1961 P. V. H. WEEMS 3,002,278
METHOD FOR SPACE NAVIGATION
Filed March 6, 1959 3 Sheets-Sheet 2

INVENTOR
P. V. H. WEEMS

BY

ATTORNEY

Oct. 3, 1961 P. V. H. WEEMS 3,002,278
METHOD FOR SPACE NAVIGATION
Filed March 6, 1959 3 Sheets-Sheet 3

INVENTOR
P. V. H. WEEMS

BY

ATTORNEY

United States Patent Office 3,002,278
Patented Oct. 3, 1961

3,002,278
METHOD FOR SPACE NAVIGATION
Philip V. H. Weems, Randall House, Annapolis, Md.
Filed Mar. 6, 1959, Ser. No. 797,605
2 Claims. (Cl. 33—1)

This invention relates to space navigation and more particularly to a method which can be employed to determine the position of a vehicle relative to the surface of the earth when it is in orbit or on a trajectory within the relatively near regions of space surrounding earth.

The problem of space navigation has been the subject of considerable study in the recent past and various solutions heretofore proposed are being considered since various plans are well advanced at this time for putting man into orbit and beyond orbit into flight in the interplanetary space of the solar system. As presently conceived, the space flights of the foreseeable future will of necessity be limited to regions which would be considered near the earth in terms of astronomical distance and all such flights will be subject to the imperative condition that means be provided for the occupant of the space vehicle to be returned safely to earth. Accordingly, all such flights as now contemplated will start and terminate on the earth and involve maneuvers in the region approximately between the earth's surface and the orbit of the earth's moon which are crucial to the objective of the flight and particularly to the maneuver by which the occupant will initiate and control the re-entry phase into the earth's atmosphere. While a major portion of the operations performed in such a vehicle may be arranged subject to automatic control, in accordance with program sequences or ground communication link instructions, it is important that the occupant of such a vehicle be able to make determinations of his position in the event of failure of the automatic equipment and in any event for the physiological and psychological benefit which a human being in such circumstances would derive from information presented in terms of a familiar coordinate system.

It is an object of this invention to provide a simple method for navigation in a space vehicle.

A further object of this invention is to provide a simplified method for navigation which permits a direct observation of position relative to the surface of the earth to be made in a space vehicle.

Another object of this invention is to utilize an extremely light weight space navigation device and a method for navigating which is completely devoid of complicated mechanisms and circuits and hence completely immune to the possibility of inoperativeness or malfunction.

These and other objects of the invention will be apparent from the following detailed description taken in conjunction with the accompanying drawings wherein.

In accordance with one device usable in practicing the present invention a transparent star hemisphere is arranged with a sidereal hour angle and declination grid thereon and a suitable eye piece is provided for sighting from the effective center of the hemisphere out through the hemisphere surface toward the earth disc as observed from the space vehicle. By selecting a suitable hemisphere depending upon the relative position of the earth and the space vehicle, the star field observed beyond the earth and particularly the stars which surround the earth disc as observed from the space vehicle can be aligned with the stars marked on the star globe. Orientation of the star globe such that two known stars on the globe coincide with the observed position of the same stars in the star field surrounding the earth disc will result in orientation of the globe in a manner such that the polar axis of the globe is parallel to the polar axis of the earth. For this condition, the sidereal hour angle and declination grid on the star globe are, in effect, projected onto the celestial sphere in which the star field is observed and the position of the earth disc in this projected grid corresponds with the position of the space vehicle above the surface of the earth. The exact location of the space vehicle will therefore correspond to the center of the earth disc as it is positioned on the sidereal hour angle and declination grid of the star globe. A modification of the device provides a direct indication of the space vehicle's position in terms of earth latitude and longitude.

Figure 1:
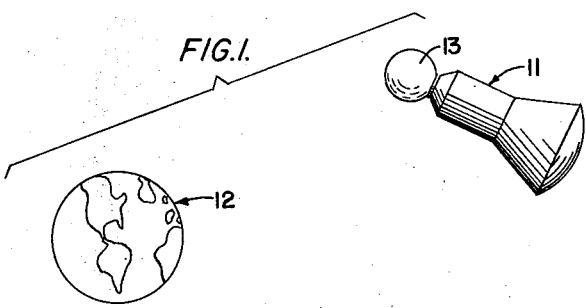
FIG. 1 is a representation of a satellite in orbit at a considerable altitude above the surface of the earth.

Referring now to FIG. 1, a schematic representation of a space vehicle 11 in orbit about the earth 12 is shown. The situation depicted in FIG. 1 is representative of a condition which forms an important part of any space travel contemplated in the foreseeable future. Thus, in the near future, the representation of FIG. 1 corresponds to a manned space vehicle in orbit about the earth and at some future date, the launching and re-entry of a space vehicle on more extended flights in the solar system will also include a flight phase corresponding generally to the configuration of FIG. 1. For the purpose of the present invention, a space vehicle 11 is presumed to have a means 13 for visual or optical observation. As represented in FIG. 1 the means 13 comprises a transparent spherical portion of the space vehicle wall which an observer may use to survey the surrounding space over a wide solid angle field of view. Manifestly, any other simple means of observation or optical sighting may be provided in the space vehicle 11 other than as represented.

It is well known in the art of celestial navigation that the earth 12 is positioned in a relatively fixed star field with the positions of the various stars with respect to the center of the earth fixed over long periods of time and that the angular positions thereof are accurately known. The rotation of the earth about its own axis and the orbit of the earth about the sun introduce apparent motions to the observer on the earth of the fixed star field surrounding the earth and these apparent motions are corrected for in any observations made by an observer on the surface of the earth or flying in a conventional aircraft near the surface of the earth. The basis of celestial navigation is that the angular measurement of the positions of known fixed stars and the determination of the angles of a given set of star configurations for a given point on the surface of the earth uniquely determines that point. Due to the vast astronomical distances at which the star fields are located however, the angular locations of the stars will not be changed by a mere translation in space within the vicinity of the earth of the order of solar system distances. Accordingly, a coordinate system for the earth and the celestial globe surrounding the earth will apply equally as well to an orbiting space vehicle if the angular orientation between the celestial sphere and a coordinate grid is the same as that employed on the earth's surface. As a final step, of course, the earth's longitude coordinate will require to be corrected for time of day with reference to the Greenwich meridian as is well known by adding Greenwich hour angle of the first point of Aries ($\Upsilon$) to the sidereal hour angle. The present invention utilizes these facts in the manner hereinafter described.

Figure 2:
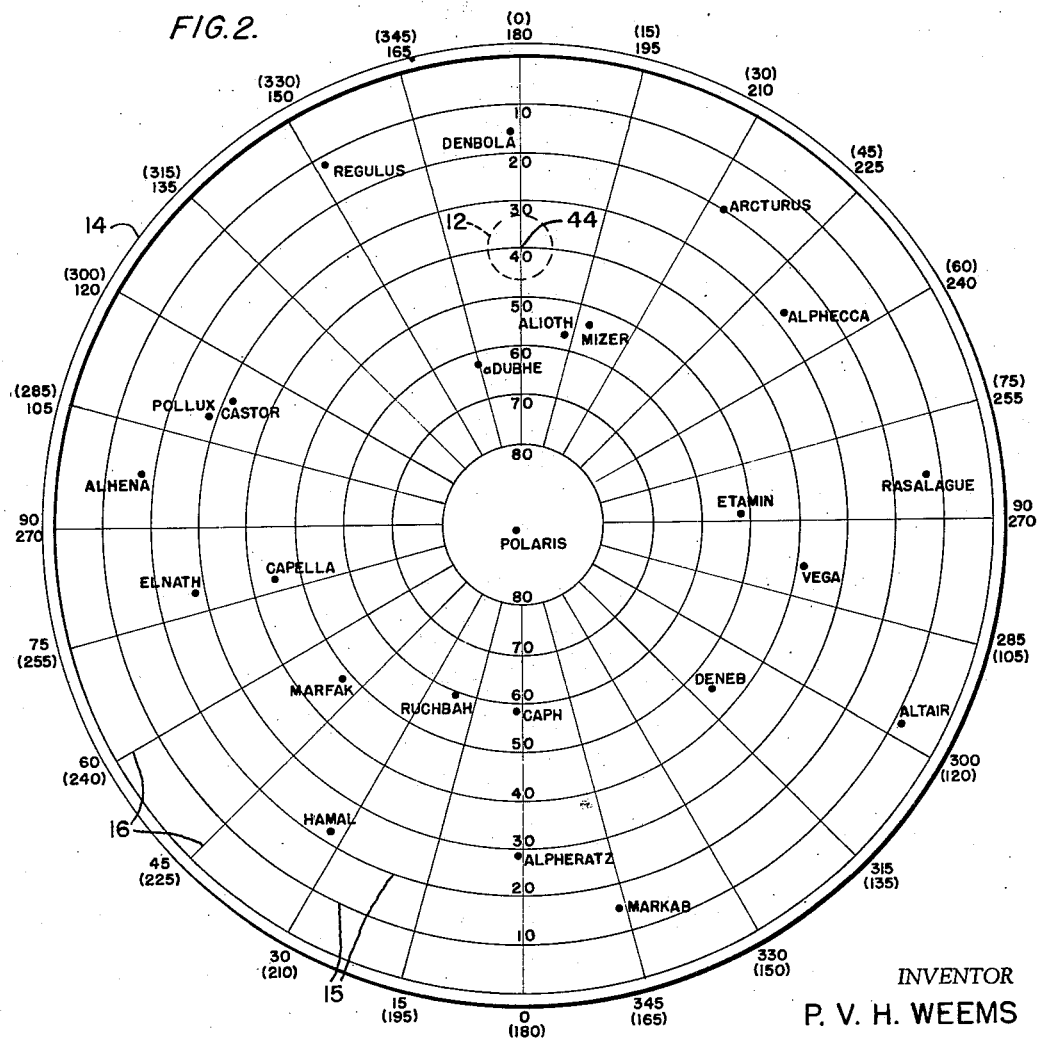
FIG. 2 is a flat developmental view of a hemispherical navigation device utilizable in accordance with the present invention as viewed from the side of the observer.

FIG. 2 shows an elementary form of navigation device usable in accordance with the invention which comprises a transparent hemisphere 14 which may be of suittable material such as methyl methacrylate, for example. On the spherical surface of the hemisphere 14 are inscribed declination circles 15 and sidereal hour angle arcs 16. Also inscribed on the surface of the hemisphere 14 are members of the celestial star field for a particular hemisphere properly positioned with reference to the celestial sphere and the grid formed by the circular lines 15, 16. A suitable number of stars are inscribed on the hemisphere 14 and identified by name, for example, to provide a sufficient number for navigational purposes as may be required. The inscription of the grid 15, 16 and the star field with the identifying names of the stars may be in the form of an engraving such that in combination with the material forming the hemisphere 14 the grid and star field may be illuminated by well known edge lighting techniques as will hereinafter be set forth. As used for space navigation, the apparatus of FIG. 2 will appear to the observer's eye located at the center of the hemisphere much as it appears drawn in FIG. 2 and in use the apparatus will be directed in the direction of the earth which will appear as a disc 12 in the field of vision.

Figure 3:
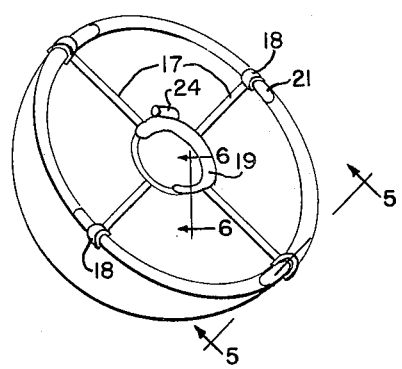
FIG. 3 is a perspective view of the navigation device of FIG. 2 showing details of the construction.
Figure 4:
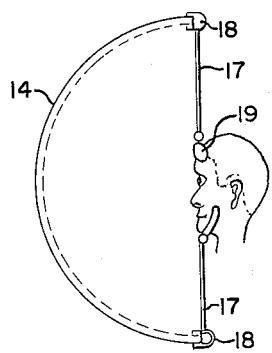
FIG. 4 is a sectional side elevational view of the device of FIG. 3.
Figure 5:
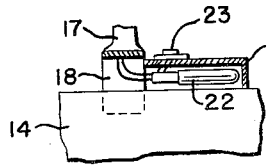
FIG. 5 is a view partly in section taken along the line 5—5 of FIG. 3.

FIGS. 3 and 4 show a suitable arrangement for utilizing the navigational device of FIG. 2. For this purpose a plurality of support arms 17 are arranged with spring clips 18 at the extremities of the arms 17 and supporting a face support member 19 at a central location relative to the hemisphere 14. The face support member 19 may be any suitable device for accurately positioning an observer's eye at the center of the hemisphere 14. Many well known optical devices use fine cross hairs as a positioning index. In the detail of FIG. 5 the clips 18 are shown engaging the wall of the hemisphere 14 and are provided with a lamp housing 21 containing a suitable source of light 22 for edge lighting the hemispherical shell 14. Switch means 23 may be provided for selectively illuminating the sphere 14. Any suitable source of energy for the illumination means 22 may be employed such as a self contained battery as indicated at 24 in FIG. 3.

Figure 6:
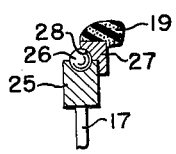
FIG. 6 is a sectional view along the line 6—6 of FIG. 5.

The details of supporting the face rest 19 on the arms 17 are shown in FIG. 6 wherein the support rods 17 terminate in a circular race 25 supporting a plurality of balls 26 spaced around the race 25. By suitable means the assembly 25, 26 may be magnetized in order to attract the circular frame 27 which supports the face pad 19. The member 27 is shaped with a curved inner surface 28 formed to fit the balls 26 and provide a ball bearing type relative movement between the members 27 and 25. With this arrangement the entire apparatus may be freely rotated about the eye of the observer when he positions his face on the pad 19 to center one eye at the center of the hemisphere 14. For convenience the assembly 27, 19 may be readily removed by applying sufficient force to overcome the magnetic attraction of the magnetic means provided in the race 25.

Figure 8:
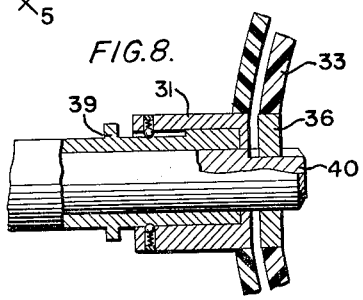
FIG. 8 is a sectional view of a drive coupling for the modification shown in FIG. 7.
Figure 7:
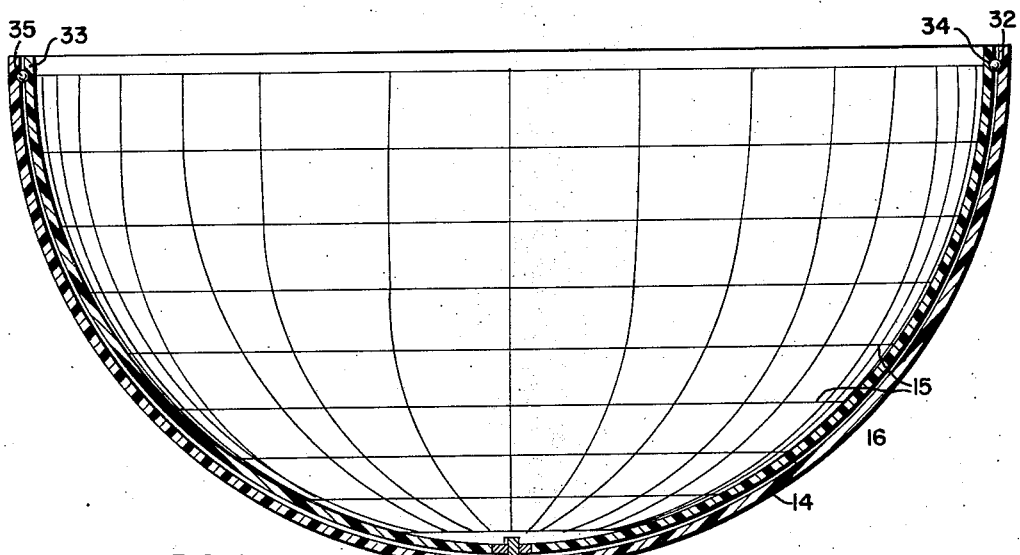
FIG. 7 shows a modification of the device for use in accordance with the invention to provide an indication of actual earth latitude and longitude.

An arrangement for employing the method of the invention to obtain an indication relative to the actual earth latitude and longitude is shown in FIG. 7. For this purpose the star globe 14 may be provided with a central bushing 31 and a grooved raceway 32 near the equatorial plane. A second concentric hemisphere 33 of slightly smaller radius than the hemisphere 14 is arranged to be placed within the hemisphere 14. The hemisphere 33 has a grooved raceway 34 to cooperate with a plurality of balls 35 spaced around the equatorial plane of the spheres for rotatably supporting the spheres 14 and 33 relative to each other. As shown in FIG. 8, the sphere 33 has a keyed apperture bushing 36 at the pole position opposite bushing 31. The hemisphere 33 may be of suitable transparent material and has a representation of the earth's land masses thereon and generally resembles the hemisphere from a conventional globe of the world. The sphere 33 may also be edge lighted from the same light source as employed to edge light the sphere 14. With this arrangement, the correct relative rotative position of the spheres 14 and 33 will convert the sidereal hour angle arcs 16 and declination circles 15 into longitude and latitude coordinates respectively on the representation of the earth on globe 33. The correct relative position of hemispheres 14 and 33 is maintained by a sidereal hour clock 37 which may be connected by a flexible shaft drive to the bushing 31 and keyed aperture bushing 36 in the sphere 33. The flexible shaft 38 terminates in a keyed bushing 39 which fits the bushing 31 in the sphere 14 and the drive shaft 40 within the flexible cable 38 is keyed to fit the keyed aperture 36 in the sphere 33. Accordingly, the keeping of correct time on a sidereal clock 37 will automatically result in the spheres 14 and 33 being correctly relatively positioned by merely inserting the flexible cable 38 into the bushing 31 with the cable bushing 39 in registry with the key means therein and rotating the inner sphere 33 until the keyed aperture 36 fits the keyed drive shaft 40. The assembled relation may be maintained by detents or other suitable means.

Figure 9:
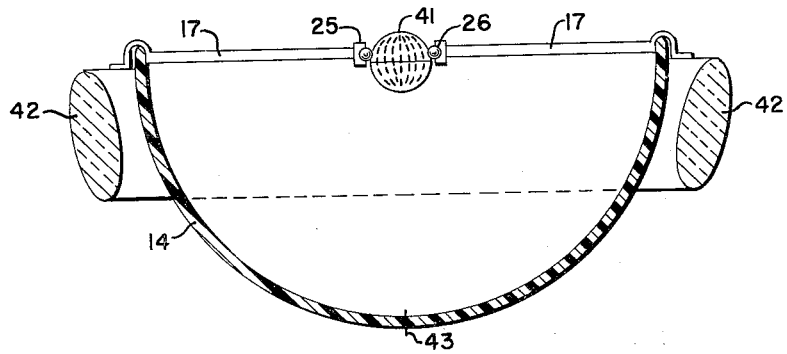
FIG. 9 shows a modification of the device.
Figure 10:
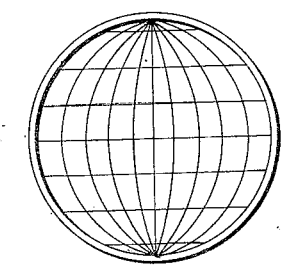
FIG. 10 shows an alternate hemisphere.

Referring now to FIG. 9 a modification of the device usable in practicing the invention is shown. For relatively low altitudes of the space vehicle the earth disc will occupy a wide angle of the field of vision and accordingly it may be possible that the stars observed beyond the horizon of the earth may be at extreme angles approaching the equatorial plane of the star globe 14. For these conditions it may be desirable to modify the navigational device by providing in the race 25 a planetarium type sphere 41 which may be magnetically retained in a universally rotatable position against the balls 26. The sphere 41 may be a hollow shell with a suitable sidereal hour angle and declination grid formed therein in the form of perforated lines the perforations not being continuous in order to maintain the physical structure of the sphere 41 intact. Also accurately located on the sphere 41 are perforations and identifying marks corresponding to the navigational stars. Within the sphere 41 a suitable light source is provided with means for turning the light source on and off and, if desired, a self contained power supply such as a battery. With this arrangement and the light source energized the sphere 41 will project on the inner surface of the hemisphere 14 a coordinate grid and points of light representing the various stars used for navigation and an identification thereof such as the names of the stars. By rotating the sphere 41 in its mount until the points of light corresponding to particular stars are in registry with the actual star image on the surface of the sphere 14, a correspondence will be obtained between the coordinate grids projected on the inner surface of the sphere 14 and the coordinates on the earth as viewed through the sphere 14. For the purposes of obtaining images of the stars in the star field on the hemisphere 14 a suitable optical device such as an annular lens 42 may be provided to focus images of the stars on the hemisphere 14. Since this modification of the apparatus used may find primary utility for stars located at wide viewing angles, the lens 42 is indicated as being an annular lens suitable for producing star images within 20° approximately of the equatorial plane. Under these conditions it will be advantageous to employ the circles of declination 15 to center the earth image therein in order that the pole 43 of the hemisphere 14 may be used as a ground point index as will be hereinafter explained. FIG. 10 shows an alternate sphere having suitable hour angle and declination grids imprinted thereon which may be used in place of sphere 41 of FIG. 9.

Figure 11:
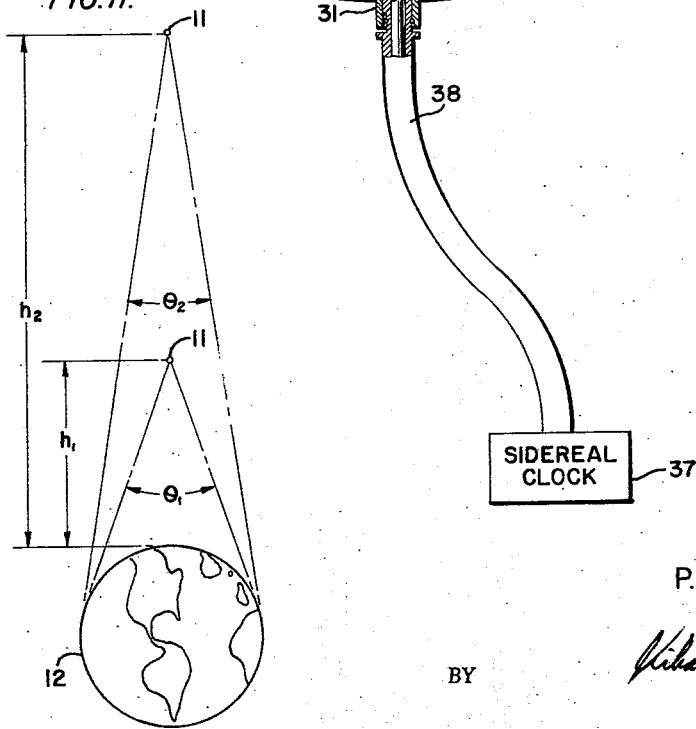
FIG. 11 shows an altitude determination method.

When in space, an observer requires a three dimensional position. To determine his altitude vertically above his geographical position, the space observer measures as indicated in FIG. 11 with a marine sextant, an iris shutter, a peripheral scanning device, or by any of several available means, the angle subtended by the earth's disc. With this observed angle as an argument, together with the earth's diameter, the required third dimension, altitude, in terms of nautical miles vertically above the observer's geographical position may be computed by standard trigonometrical methods. Additionally, a standard table may be prepared which indicates altitudes for various angles subtended by the earth's disc. Thus, the observer would have available a quick reference upon determination of the subtended angle.

The method of the present invention will be described with reference to the apparatus disclosed. Referring to FIGS. 3 and 4 for the use of the hemisphere described in detail in FIG. 2, the observer will place the face against the rest assembly 19 in the rotatable mount 25 and thus place his eye in the center of the hemisphere 14. Referring now to FIG. 2, the view to the observer will generally be that of looking through a hemisphere with the appropriate grid markings thereon and the device will be directed so the observer may look in the general direction of the earth 12. By selecting suitable navigation stars in the hemisphere in which he is looking the observer can rotate the hemisphere 14 and change the polar direction of the hemisphere 14 until two or more observed stars coincide with the engraved representations of the same stars on the surface of the hemisphere 14. For this purpose the stars may be illuminated by energizing the lamp 22 with the switch 23 to edge light the engraved indices on the plastic hemisphere 14. For these conditions, the grids 15 and 16 and the stars marked thereon will be illuminated and clearly discernable to the operator. Once the actual stars have been observed as superimposed on the representations thereof engraved on the hemisphere 14, the observer's position relative to the earth can be read directly from the scales associated with the grid 15, 16. The exact position will correspond with the center 44 of the earth disc 12. It should be noted that the reading of the scales associated with the grid 15, 16 will correspond to those of the opposite hemisphere to that over which the observer is located. In other words the celestial hemisphere and the stars on which the observer is taking a fix correspond to that hemisphere which is on the far side of the earth with respect to the observer. However, to know his position the observer may interpret his position above the earth as diametrically opposite that position located in the celestial hemisphere on the far side of the earth. Accordingly, the grid 15 and 16 may be designated with index numbers in which observed declination is opposite as to North and South designation that of the observed stars and sidereal hour angle is the sum of the sidereal hour angle plus 180° of the observed stars for the northern hemisphere of celestial bodies depicted in FIG. 2. The actual position of the vehicle which would be occupied when using the hemisphere would correspond to the grid markings in the southern hemisphere for declination and with the sidereal hour angles marked as shown in parentheses. Obviously, this correction could be interpreted by the observer with the scales marked in the usual manner for the hemisphere being observed.

The operation of the device of FIG. 7 corresponds generally with that just described with reference to FIG. 2, except that the sidereal clock 37 has been suitably engaged to drive the earth globe 33 relative to the hemisphere 14. Upon taking an observation with the apparatus of FIG. 7 the position of the earth disc 12 and in particular the center thereof 44 will be located at the ground point of the space vehicle on the earth globe 33. Since the earth globe 33 is provided with representations of the land masses and bodies of water of the earth in a normal manner, the space navigator can recognize his location on the surface of the earth by observing the center 44 of the earth disc 12 relative to the actual representation of the earth on the globe 33 and the latitude and longitude coordinates.

In using the apparatus of FIG. 9 the preferred arrangement would be to center the earth disc 12 in the declination circles 15 in order that the pole 43 would accurately represent the center 44 of the disc 12. With this arrangement the projected points of light representing stars and the grid representing declination and sidereal hour angle are variably positioned on the inside surfaces of the hemisphere 14 upon projection from the sphere 41. The lens 42 focuses images of the real stars on the surface of the hemisphere 14 and by rotating the globe 41 coincidence between known navigational star images and the projected points of light representing the stars is obtained. For this condition, the grid then projected on the earth disc observed as centered in the meridian lines 15 will give the accurate location of the space vehicle 11 with the ground point or geographical location of the vehicle indicated by the pole 43 on the projected grid coordinates.

To summarize, a method utilizing simple, manually operated, lightweight means has been described for fixing the position of a space vehicle directly, continuously, and in units of latitude, longitude and altitude in nautical miles, with which the space navigator will be familiar.

When the observer is so far from earth that its rotation might be ignored, the observed sidereal hour angle and latitude of his geographical position would suffice. The supplemental globe 33 driven by a sidereal clock 37 merely adds Greenwich hour angle of Aries continuously and automatically. Alternatively, the observer could find this value from the air almanac for any desired instant and add this to his observed sidereal hour angle to determine his longitude.

The method described might be compared with the technique of piloting in marine navigation where the bearing of and distance from a lighthouse are well known. In the present method a way is provided for fixing the geographical position of the latitude and longitude of the observer, which is the point where the line from the observer to the center of the earth pierces the earth's surface. A simple way has been disclosed for determining the altitude of the observer vertically above his geographical position, and this, in familiar terms.

While particular devices usable in practicing the invention and methods of operating same have been disclosed it will now be apparent to those skilled in the art that various modifications thereof may be made. The invention is not to be limited to utilization of the specific devices shown by way of illustration but only by the appended claims.

I claim:

1. The method of finding the ground point of a space vehicle comprising the steps of observing the earth and the star field beyond the earth in the direction of observation, orienting a sidereal hour angle and declination angle grid with at least two known stars in said star field and reading the location of ground point on said grid at the center of the earth as observed from said vehicle.

2. The method of finding the latitude and longitude of the ground point of a space vehicle comprising the steps of observing the earth and the star field beyond the earth in the direction of observation, establishing reference coordinates oriented with at least two known stars in said star field, rotatably displacing a latitude and longitude grid from said reference coordinates by the Greenwich hour angle of the first point of Aries, and reading the latitude and longitude of ground point on said grid at the center of the earth disc as observed from said vehicle.

References Cited in the file of this patent

UNITED STATES PATENTS

| | | |
|---|---|---|
| 53,420 | Daly | Mar. 27, 1866 |
| 531,705 | Wadsworth | Jan. 1, 1895 |
| 2,508,027 | Hoffmeister | May 16, 1950 |